(12) United States Patent
Hatzav et al.

(10) Patent No.: US 8,274,713 B2
(45) Date of Patent: Sep. 25, 2012

(54) COVER DEVICE FOR AN IMAGE SCANNER

(76) Inventors: Iuval Hatzav, Culver City, CA (US);
Ilan Ben-Shahar, Savion (IL); Giyora Sharaby, Moshav Neve Yarak (IL);
Daniel Hatzav, Hod Hasharon (IL)

( * ) Notice: Subject to any disclaimer, the term of this patent is extended or adjusted under 35 U.S.C. 154(b) by 414 days.

(21) Appl. No.: 12/765,320

(22) Filed: Apr. 22, 2010

(65) Prior Publication Data
US 2011/0261423 A1 Oct. 27, 2011

(51) Int. Cl.
*H04N 1/04* (2006.01)
*G06K 7/00* (2006.01)
*G06K 7/06* (2006.01)
*G06K 7/10* (2006.01)
*G06K 19/06* (2006.01)
*G06F 1/16* (2006.01)

(52) U.S. Cl. ... 358/474; 358/498; 358/497; 235/472.01; 235/492; 235/454; 235/439; 235/441; D14/385; 361/679.11

(58) Field of Classification Search .................. 358/498, 358/474, 497; 235/472.01, 492, 454, 439, 235/441; D14/385; 361/679.11
See application file for complete search history.

(56) References Cited

U.S. PATENT DOCUMENTS

| | | | | |
|---|---|---|---|---|
| 6,078,407 | A | * | 6/2000 | Ma .................................. 358/474 |
| D477,321 | S | * | 7/2003 | Baughman .................... D14/385 |
| 6,672,514 | B1 | * | 1/2004 | Brennan et al. ............... 235/492 |
| 8,033,467 | B2 | * | 10/2011 | Hazel ............................ 235/454 |
| 2004/0149827 | A1 | * | 8/2004 | Zuili ............................. 235/439 |
| 2006/0065736 | A1 | * | 3/2006 | Lee et al. .................. 235/472.01 |
| 2011/0315769 | A1 | * | 12/2011 | Hazel ............................ 235/454 |

\* cited by examiner

*Primary Examiner* — Charlotte M Baker
*Assistant Examiner* — Rury Grisham

(57) ABSTRACT

An image acquisition apparatus for acquiring an image of a document including a housing having an internal space, a substantially transparent window, a CCD sensor array, a light source for illuminating the document and an opaque cover device for blocking light from escaping the internal space of the housing through the transparent window. The cover device includes an opaque wall that combined with the document, operationally blocks the escaping of light from the internal space of the housing. The cover device further includes a primary insertion slit, a document removing mechanism and a removal slit for removing a small form document through the removal slit. Optionally, the cover device further includes a second insertion slit for inserting the small form document. The width of the second insertion slit is smaller than the width of the first insertion slit.

11 Claims, 6 Drawing Sheets

COVER DEVICE FOR AN IMAGE SCANNER

FIELD OF THE INVENTION

The present invention relates to covers for an image acquisition apparatus of tangible documents and more particularly, this invention is directed to covers of the transparent surface of an image acquisition apparatus for scanning tangible documents, which cover facilitates the handling of multiple sized documents.

BACKGROUND OF THE INVENTION

There exist in today's market devices, such as document scanners, which serve to scanned documents, for example passports, ID cards, drivers' license, business cards and the like. Typically, a document scanner with a CCD array is mechanically and optically designed to scan documents having substantially the same dimensions, typically standard dimensions. For example, business cards are typically 90 mm×50 mm. Similarly, US drivers' license is typically 86 mm×54 mm. Hence, both document types can be scanned by the same document scanner. But a passport page is typically 130 mm×95 mm and should be used by a different document scanner.

Typically, in portable image acquisition apparatuses, the transparent surface on which the document to be scanned is placed bare and do not include a lid. Referring to FIG. 1 (Prior art), an image acquisition apparatus 20, having a body 24, is shown. A document, such as a passport, is place adjacent to a substantially transparent window 22, having an external surface. A camera 26, disposed inside the internal space of housing 24, acquires an image of the document.

Typically, image acquisition apparatus 20 further includes illumination means to illuminate the document face to be imaged. Often, the illumination includes rays of wave length, such as UV, that are blocked by the document, whereby preventing such potentially harming rays from reaching the user.

For efficiency/economic reasons, image acquisition apparatus 20 is also used to image other documents having a smaller form than a passport page (representing a "large form document"), for example a business card or a driver's license (representing a "small form document"). However, in such cases, harming light rays may escape around the smaller documents margins and thereby endanger the user.

One solution is illustrated in FIG. 2 (Prior art), which illustrates a perspective view of a portable image acquisition apparatus 60 for acquiring image frames of a passport page. Apparatus 60 includes a fixed cover 70 which blocks rays from escaping the image apparatus. But inserting a small form document through slit 80 requires turning the whole apparatus 60 upside down in order to remove the document after the scanning operation.

Thus, there is a need for and it would be advantageous to have a device such as a cover for the image apparatus that covers facilitating handling multiple sized documents that blocks rays from escaping the image apparatus.

SUMMARY OF THE INVENTION

According to the teachings of the present invention, there is provided an image acquisition apparatus for acquiring an image of a document. The image acquisition apparatus includes a housing having an internal space, a substantially transparent window having an external surface, a width and height dimensions, a CCD sensor array, a light source for illuminating the document and an opaque cover device for blocking light from escaping the internal space of the housing through the transparent window.

The cover device includes an opaque wall, having an upper section and a lower section, a top edge, a bottom edge and two side edges, and a width and height dimensions, wherein the width of the wall is equal or larger than the width of the transparent window, and the height of the wall is equal or larger than the height of the transparent window. The cover device further includes a document removing mechanism for removing the document from behind the cover. The cover device further includes a first insertion slit, having a width, formed at one or more of the cover edges selected from the group consisting of the top edge one of the side edges and both the side edges, for inserting the document.

The wall of the cover forms a gap substantially parallel to the external surface of the transparent window, wherein during an image acquisition operation the document is disposed on the external surface of the transparent window, in the gap between the cover and the transparent window. The cover and the document combine to operationally block the escaping of light from the internal space of the housing.

The cover device further includes a removal slit, formed at one or both side edges, for removing a small form document, wherein the document removing mechanism facilitates removal of the small form document through the removal slit.

In variations of the present invention, the document removing mechanism is a laterally elongated finger groove disposed substantially at the lower section of the wall, typically at the lateral center of the lower section of the wall, wherein the removal of the document is typically performed by a user pushing a finger or an article against the document through the laterally elongated finger groove, and moving the finger/article and thereby the document towards and through the removal slit.

It should be noted that the first insertion slit also facilitates removal of the document.

In variations of the present invention, the cover device further includes a second insertion slit, having a width, disposed at the top section of the wall of the cover, for inserting a small form document. The width of the second insertion slit is smaller than the width of the first insertion slit.

In variations of the present invention, the transparent window of the image acquisition apparatus is a primary transparent window, and the image acquisition apparatus further includes a secondary, substantially transparent window having a top edge, a bottom edge, two side edges, and a width and height dimensions. The secondary transparent window built into the cover wall, and a supporting mechanism is disposed at the bottom edge of the secondary transparent window, for supporting the document. Operationally, either a large form document is disposed on the external surface of the primary transparent window or a small form document is disposed on the external surface of the secondary transparent window, and supported by the supporting mechanism, during an image acquisition operation.

It should be noted that both the external surface of the primary transparent window and the external surface of the secondary substantially transparent window are within the focal depth of the camera.

In variations of the present invention, the secondary transparent window is disposed substantially at the center of the cover wall.

BRIEF DESCRIPTION OF THE DRAWINGS

The present invention will become fully understood from the detailed description given herein below and the accompanying drawings, which are generally not drawn to scale and are given by way of illustration only and thus, not limitative of the present invention, and wherein.

DETAILED DESCRIPTION OF THE INVENTION

Figure 1:
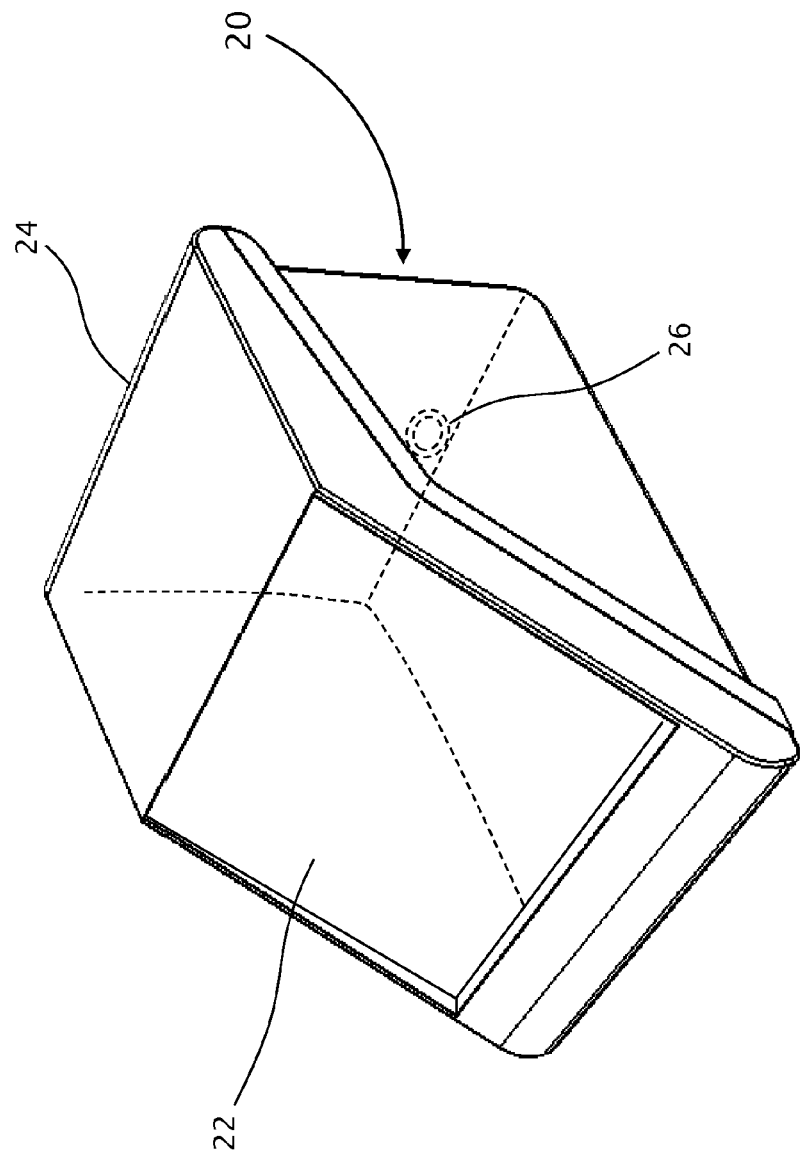
FIG. 1 (Prior art) illustrates a portable image acquisition apparatus for acquiring image frames of documents.
Figure 2:
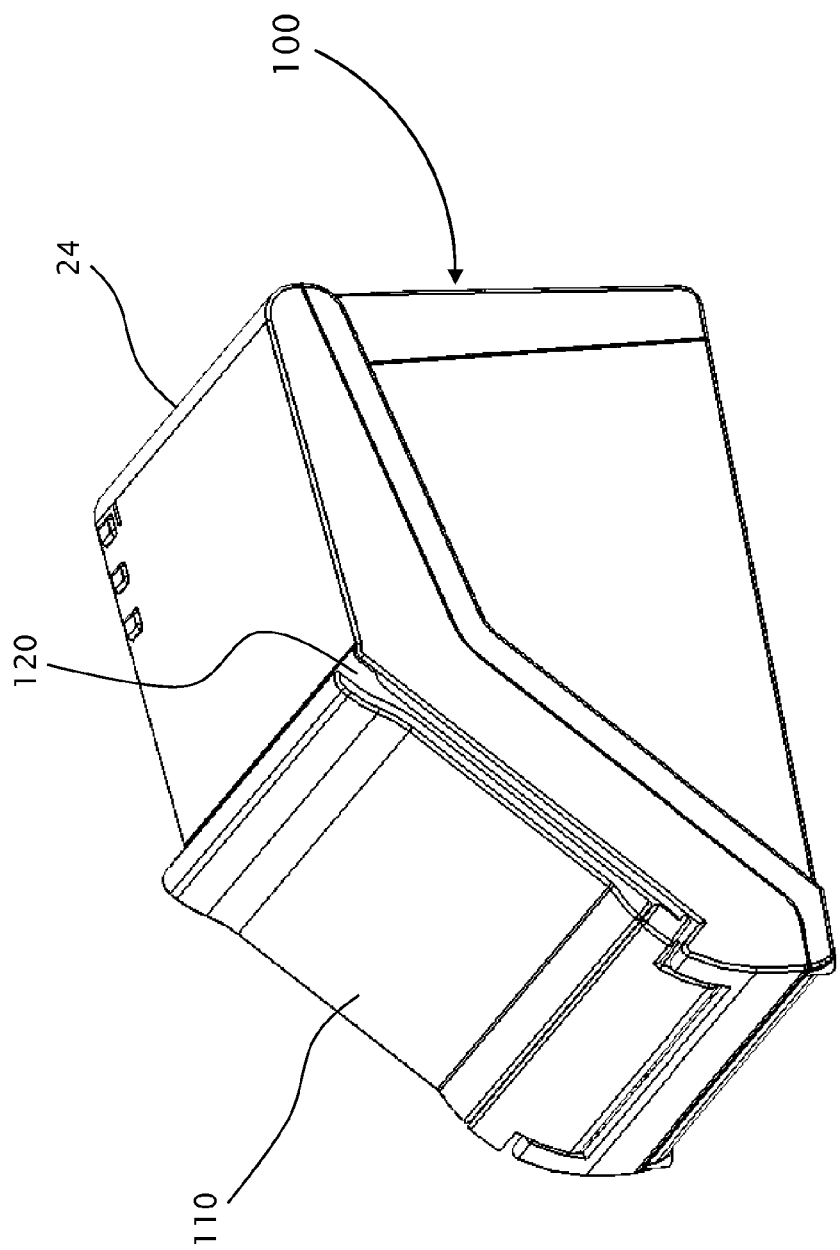
FIG. 2 (Prior art) illustrates a perspective view of a portable image acquisition apparatus for acquiring image frames of a passport page.

Before explaining embodiments of the invention in detail, it is to be understood that the invention is not limited in its application to the details of construction and the arrangement of the components set forth in the host description or illustrated in the drawings.

Unless otherwise defined, all technical and scientific terms used herein have the same meaning as commonly understood by one of ordinary skill in the art of the invention belongs. The methods and examples provided herein are illustrative only and not intended to be limiting.

By way of introduction, the present invention provides an apparatus for a document image acquisition apparatus having a cover facilitating handling multiple sized documents in an image acquisition apparatus.

Figure 3:
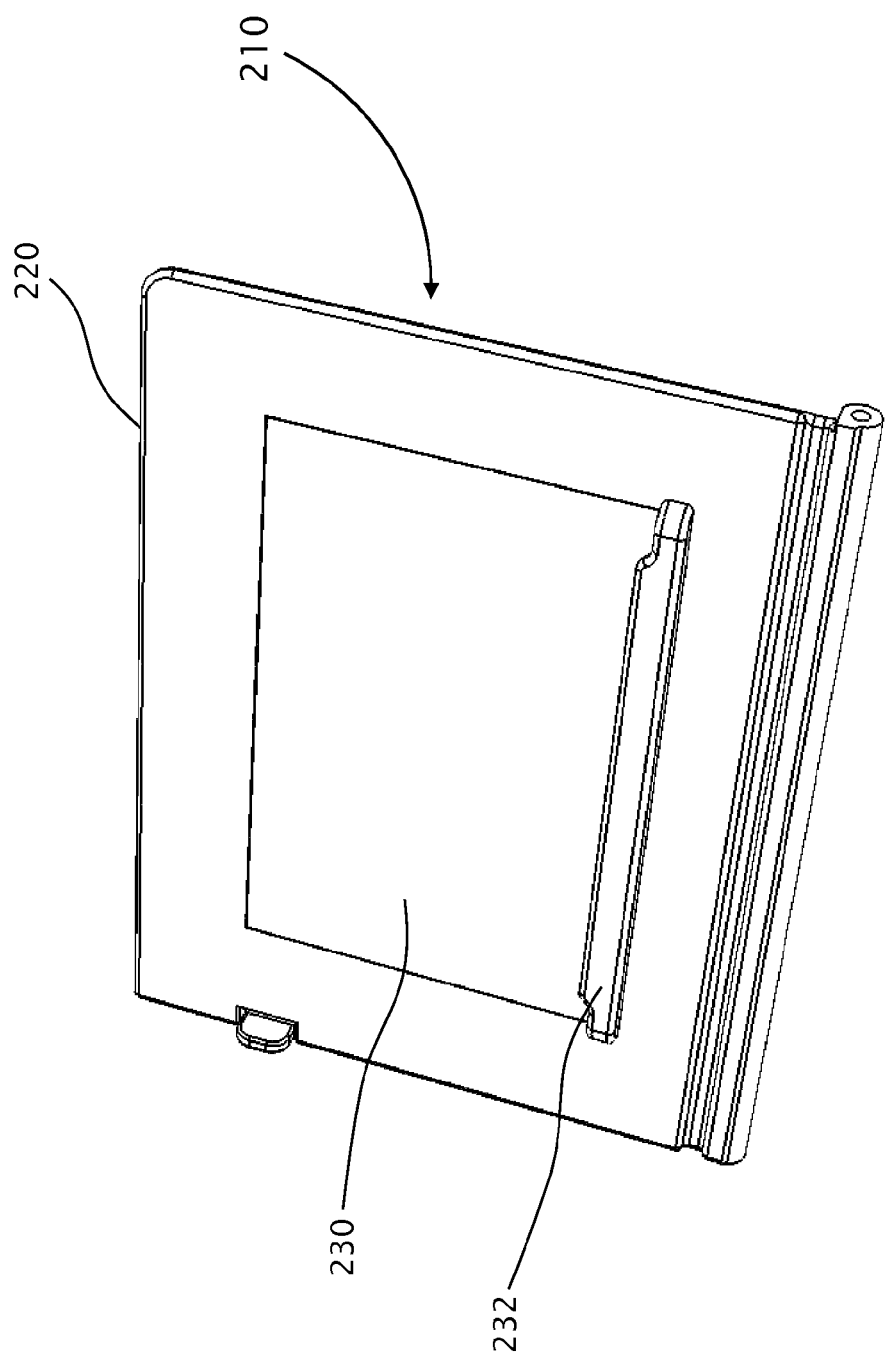
FIG. 3 illustrates a perspective view of a fixed cover for portable image acquisition apparatus for acquiring image frames of a passport page, according to variations of the present invention, having a sub window for a smaller form.

Reference is now made to FIG. 3, which illustrates a perspective view of a fixed cover 210 for a portable image acquisition apparatus for acquiring image frames of a passport page, for example, according to variations of the present invention, having a sub window 230 for a smaller form document, sub window 230 being a substantially transparent surface. The form of opaque frame 220 of fixed cover 210 fits the form of the external surface of the substantially transparent window 22. A predesigned gap between cover 210 and the external surface of substantially transparent window 22 facilitates a space for inserting the larger form document (a passport page for example).

To image a smaller form document (such as a driver's license) the smaller form document is place adjacent to sub window 230, supported by supporting element 232.

When imaging the larger form document, the document blocks the internal illumination light from escaping through sub window 230, and when imaging the smaller form document, the document blocks the internal illumination light from escaping beyond the document.

It should be noted that the focal depth of the camera includes both the external surface of substantially transparent window 22 of the transparent window and the external surface of sub window 230.

Figure 4:
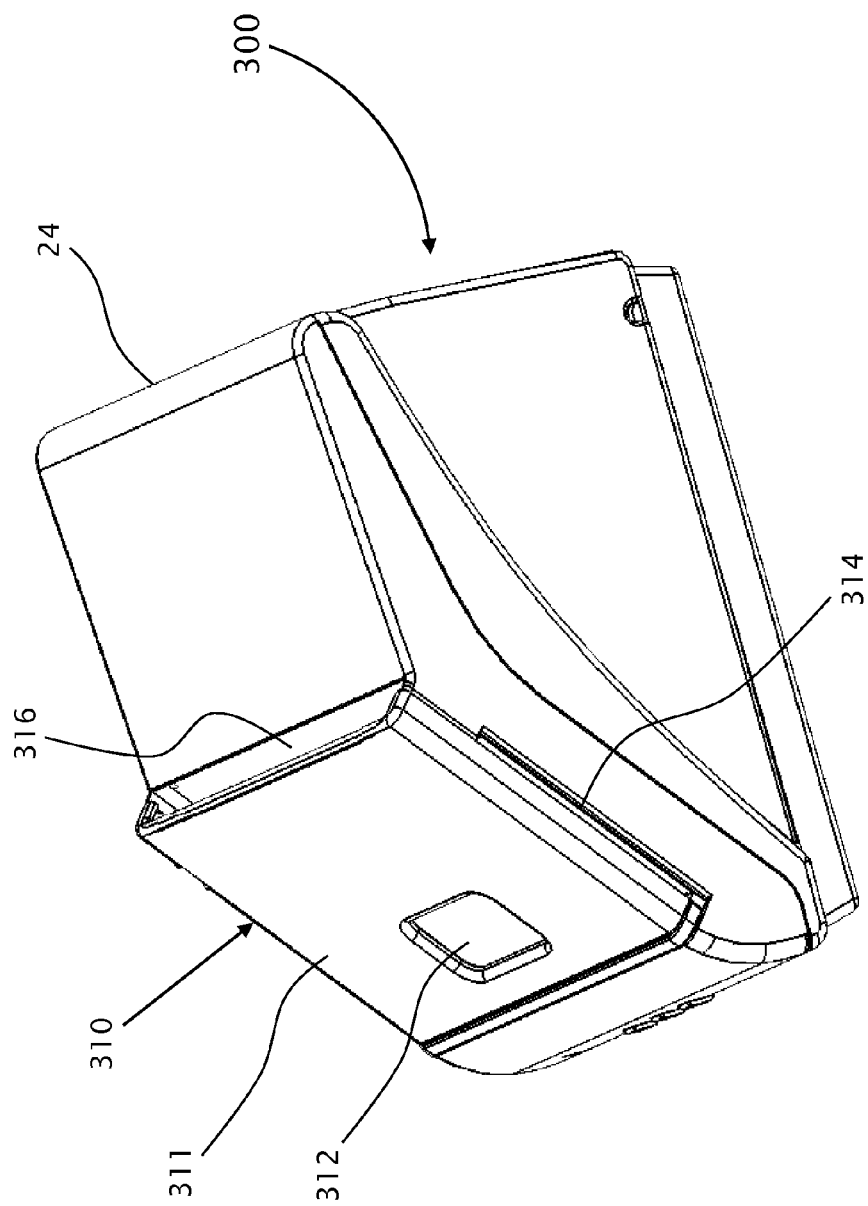
FIG. 4 illustrates a perspective view of a fixed cover for portable image acquisition apparatus for acquiring image frames of a passport page, according to embodiments of the present invention, having a finger groove to remove a small form document.

Reference is now made to FIG. 4, which illustrates a perspective view of a fixed cover 310 for portable image acquisition apparatus 300 for acquiring image frames of a larger form document such as a passport page, according to embodiments of the present invention. Cover 310 includes an opaque wall 311, which wall 311 forms a gap substantially parallel the external surface of substantially transparent window 22 of the transparent window, for hosting the document. A slit 316, formed between cover 310 and the external surface of substantially transparent window 22 of the transparent window, facilitates a space for inserting a document. To remove a larger form document, the document is pulled back through slit 316.

Cover 310 includes a document removing mechanism such as a finger groove 312 facilitating the removal of a small form document. To remove a smaller form document, the document is moved sideways by the user, for example by his/her finger or an article, towards and out of slit 314, and then pulled out trough slit 314.

Figure 5:
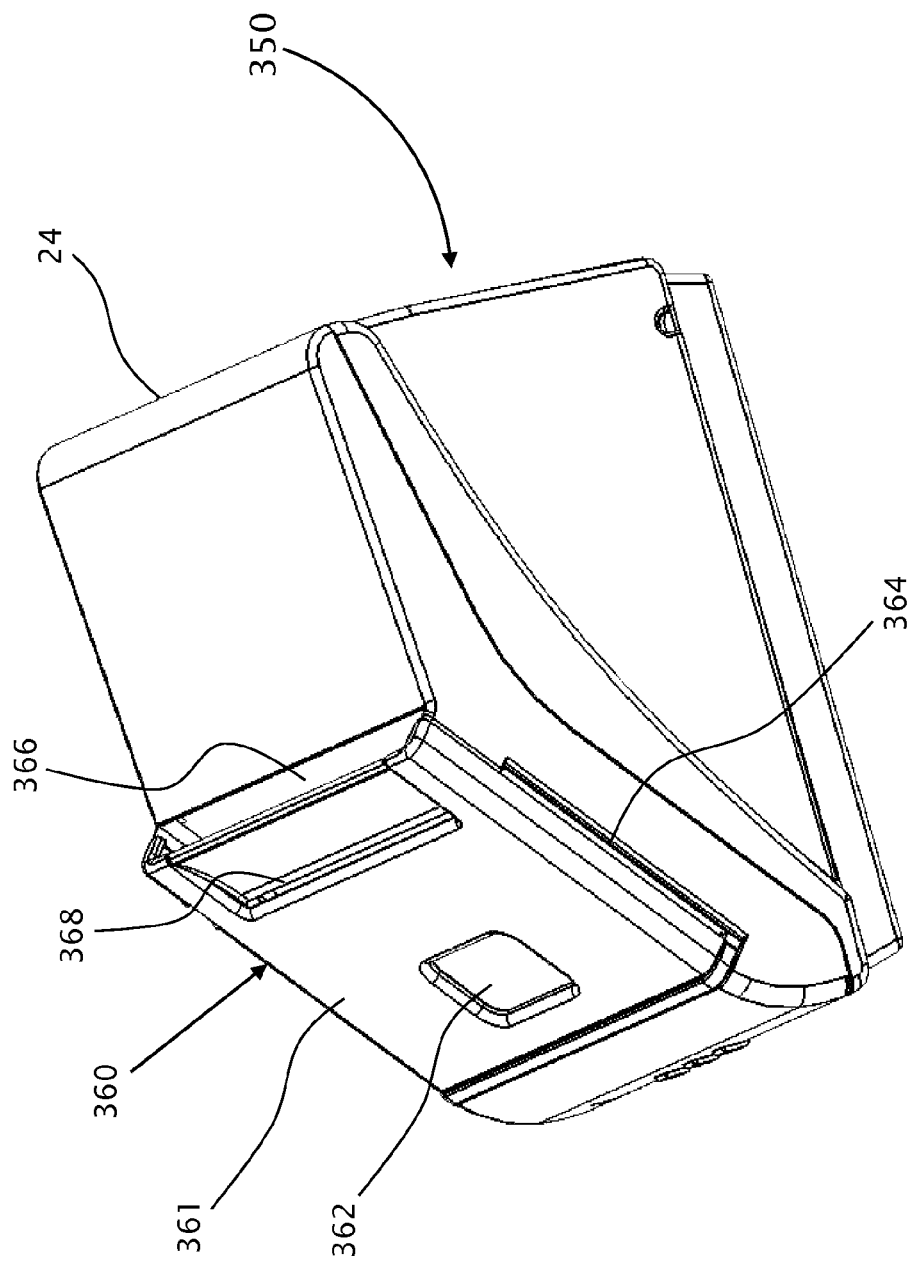
FIG. 5 illustrates a perspective view of a fixed cover for portable image acquisition apparatus for acquiring image frames of a passport page, according to a preferred embodiment of the present invention, having two insertion slits for different sized documents.
Figure 6:
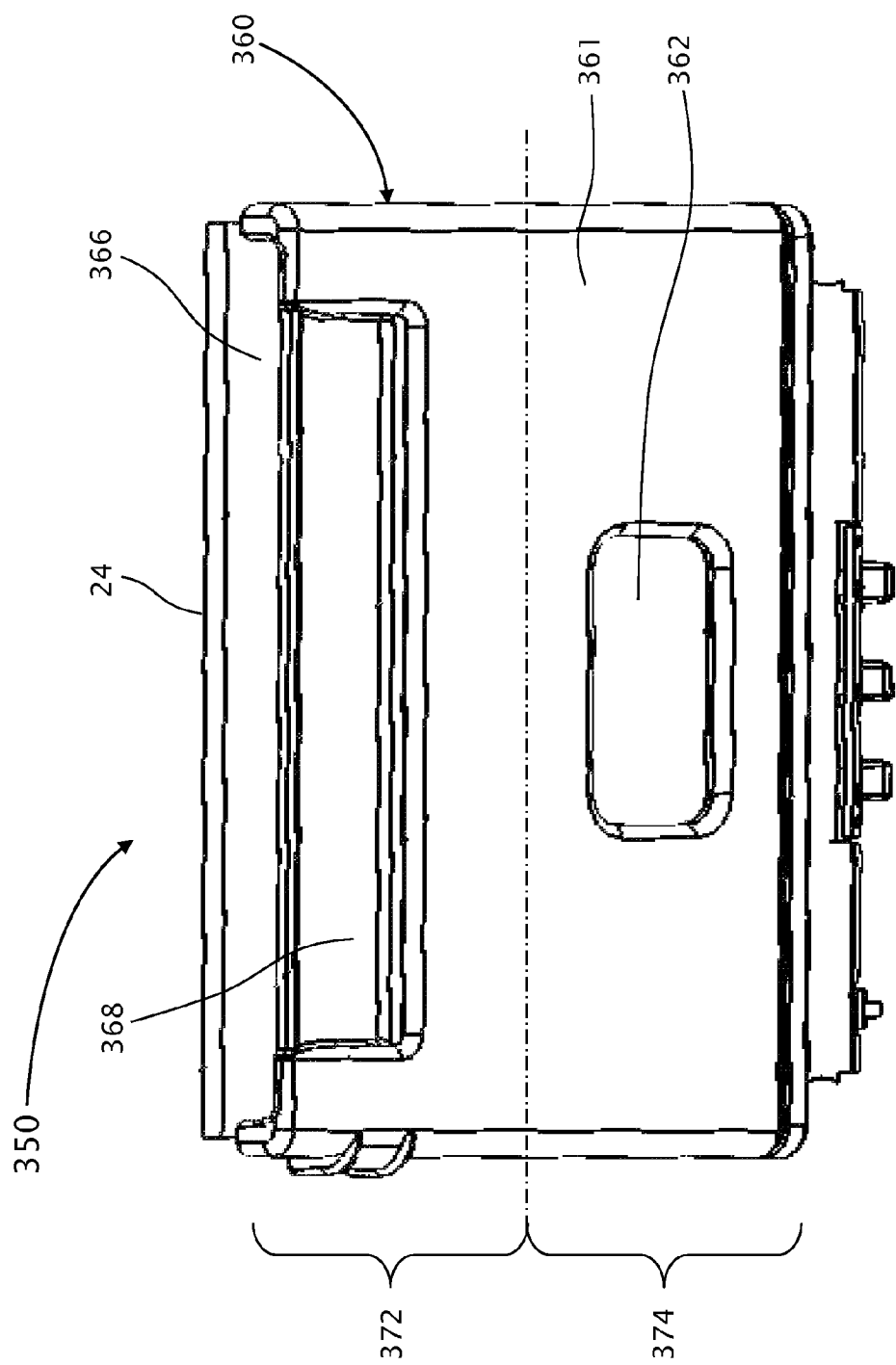
FIG. 6 is a front view illustration of the fixed cover shown in FIG. 5.

Reference is now made to FIG. 5, which illustrates a perspective view of a fixed cover 360 for portable image acquisition apparatus 350 for acquiring image frames of a larger form document such as a passport page, according to a preferred embodiment of the present invention. Reference is also now made to FIG. 6, which is a front view illustration of fixed cover 360.

Cover 360 includes an opaque wall 361, having an upper section 372 and a lower section 374. Wall 361 forms a gap substantially parallel the external surface of substantially transparent window 22 of the transparent window, for hosting the document. A slit 366 is formed between the top edge of wall 361 and the of substantially transparent window external surface 22 of the transparent window, facilitating a space for inserting a document. To remove a larger form document, the document is pulled back through slit 366.

Cover 360 includes second slit 368 facilitating the insertion of a small form document, such that the document is disposed substantially at the lateral center of the of substantially transparent window external surface 22 of the transparent window. Cover 360 further includes a document removing mechanism such as a finger groove 362 facilitating the removal of a small form document. To remove a smaller form document, the document is moved sideways by the user, for example by his/her finger or an article, towards and out of slit 364, and then pulled out trough slit 364.

In variations of the present invention, image acquisition apparatus 350 detects insertion of a document behind cover 360, thereby activating the scanning operation.

In one embodiment of the present invention, detection of the insertion of a document behind cover 360 is facilitating by sensing a substantial decrease in the light intensity levels coming into the internal space of housing 24 through finger groove 362.

In another embodiment of the present invention, detection of the insertion of a document behind cover 360 is facilitating by illuminating finger groove 362 with a beam. When no document is inserted, the beam does not return to the camera disposed inside the internal space of housing 24. When a document is inserted, the beam return from the document to the camera disposed inside the internal space of housing 24, thereby detecting the insertion of the document.

Although the present invention has been described with reference to the preferred embodiment and examples thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the following claims.

What is claimed is:

1. In an image acquisition apparatus for acquiring an image of a document, said image acquisition apparatus including a housing having an internal space, a substantially transparent window having an external surface, a width and height dimensions, a CCD sensor array, a light source for illuminating said document, and an opaque cover device for blocking light from escaping said internal space of said housing through said transparent window, said cover device comprising:
   (a) an opaque wall, having an upper section and a lower section, a top edge, a bottom edge and two side edges, and a width and height dimensions, wherein said width of said wall is equal or larger than said width of said transparent window, and said height of said wall is equal or larger than said height of said transparent window; and
   (b) document removing mechanism for removing said document from behind said cover,
   wherein said document is disposed on said external surface of said transparent window during an image acquisition operation;
   wherein said wall of said cover forms a gap substantially parallel to said external surface of said transparent window;
   wherein a first insertion slit, having a width, is formed at one or more of said cover edges, selected from the group consisting of said top edge, and one or both side edges, for inserting said document;
   wherein said cover and said document combine to block escaping of light from said internal space of said housing during an image acquisition operation;
   wherein a removal slit is formed at said one or both side edges for removing said document, said document being a small form document; and
   wherein said document removing mechanism facilitates removal of said small form document through said removal slit.

2. The cover device of claim 1, wherein said first insertion slit also facilitates removal of said document.

3. The cover device of claim 1, wherein said document removing mechanism is a laterally elongated finger groove disposed substantially at said lower section of said wall.

4. The cover device of claim 3, wherein said removal of said document is performed by a user pushing a finger or an article against said document through said laterally elongated finger groove and moving said document towards and through said removal slit.

5. The cover device of claim 1, wherein said document removing mechanism is a laterally elongated finger groove disposed substantially at the lateral center of said lower section of said wall.

6. The cover device of claim 5, wherein said removal of said document is performed by a user pushing a finger or an article against said document through said laterally elongated finger groove and moving said document towards and through said removal slit.

7. The cover device of claim 5, wherein said document is a small form document.

8. The cover device of claim 1 further comprising a second insertion slit, having a width, disposed at said top section of said wall of said cover, for inserting a small form document, wherein said width of said second insertion slit is smaller than said width of said first insertion slit.

9. In an image acquisition apparatus for acquiring an image of a document, said image acquisition apparatus including a housing having an internal space, a primary, substantially transparent window having an external surface, a width and height dimensions, a CCD array camera and a light source for illuminating said document, an opaque cover device for blocking light from escaping said internal space of said housing, said cover device comprising:
   (a) an opaque wall, having a top edge, a bottom edge and side edge, and a width and height dimensions, wherein said width of said wall is equal or larger than said width of said primary transparent window, and said height of said wall is equal or larger than said height of said primary transparent window; and
   (b) a secondary, substantially transparent surface having a top edge, a bottom edge and side edge, and a width and height dimensions, disposed on of said cover wall; and
   (c) a supporting mechanism disposed at said bottom edge of said secondary transparent window, for supporting said document,
   wherein either a large form document is disposed on said external surface of said primary transparent window during an image acquisition operation or a small form document is disposed on said external surface of said secondary transparent window and supported by said supporting mechanism, during an image acquisition operation;
   wherein said wall of said cover forms a gap substantially parallel to said external surface of said primary transparent window;
   wherein an insertion slit is formed at one or more of said cover edges, selected from the group consisting of said top edge and one or both side edges, for inserting said document; and
   wherein said cover and said document combine to block escaping of light from said internal space of said housing during an image acquisition operation.

10. The cover device of claim 9, wherein said secondary transparent window is disposed substantially at the center of said cover wall.

11. The cover device of claim 9, wherein both said external surface of said primary transparent window and said external surface of said secondary substantially transparent window are within the focal depth of said camera.

* * * * *